(12) United States Patent
Higashino

(10) Patent No.: US 6,330,055 B1
(45) Date of Patent: Dec. 11, 2001

(54) DISTANCE MEASURING APPARATUS

(75) Inventor: Fuminobu Higashino, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/404,181

(22) Filed: Sep. 27, 1999

(30) Foreign Application Priority Data

| Sep. 28, 1998 | (JP) | ................................................ 10-273772 |
| Jun. 8, 1999 | (JP) | ................................................ 11-160846 |

(51) Int. Cl.[7] ............................ G01C 3/00; G03B 13/00; G03B 3/10; G03B 3/00
(52) U.S. Cl. ...................... 356/3.06; 396/106; 396/121; 396/128
(58) Field of Search .................. 356/3.14, 3.15, 356/3.04–3.07; 396/106, 121, 128

(56) References Cited

U.S. PATENT DOCUMENTS

| 4,818,865 | * | 4/1989 | Matsui et al. . |
| 4,947,202 | * | 8/1990 | Kitajima et al. . |
| 4,992,817 | | 2/1991 | Aoyama et al. . |
| 5,081,344 | | 1/1992 | Misawa . |
| 5,130,110 | | 7/1992 | Rouet et al. . |
| 5,589,910 | | 12/1996 | Saito et al. . |
| 5,864,720 | * | 1/1999 | Miyanari . |
| 5,870,178 | | 2/1999 | Egawa et al. . |
| 6,173,122 | * | 1/2001 | Matsumoto et al. . |

FOREIGN PATENT DOCUMENTS

| 0437966 | 7/1991 | (EP) . |
| 0437996 | 7/1991 | (EP) . |
| 10243281 | 9/1998 | (JP) . |

OTHER PUBLICATIONS

Patent Abstracts of Japan, vol. 1998, No. 01, dated Jan. 30, 1998.

Patent Abstracts of Japan, vol. 1995, No. 10, dated Nov. 30, 1995.

* cited by examiner

*Primary Examiner*—Stephen C. Buczinski
(74) *Attorney, Agent, or Firm*—Greenblum & Bernstein, P.L.C.

(57) ABSTRACT

A distance measuring apparatus for measuring the distance to an object has a line of charge coupled device (CCD) elements which serve as two sensors for passive sensing and one sensor, in combination with a light emitting element, for active sensing. An infrared light cut-off filter is provided on the light receiving surface of all the elements while a visible light cut-off filter is provided on the light receiving surface of the elements corresponding to the active sensor. The light emitting element is provided with a pattern mask so that the object is irradiated with a pattern of light intensity. The active sensor detects the pattern and from this the position of the spectral center of the image can be determined to enable a distance value to be ascertained.

17 Claims, 11 Drawing Sheets

DISTANCE MEASURING APPARATUS

BACKGROUND OF THE INVENTION

The present invention relates to a distance measuring apparatus for use with cameras, video cameras, and the like for measuring the distance to an object.

One technique for the measurement of the distance to an object, the passive method, uses two light receiving sensors having the same optical system. These detect the contrast of an object in order to determine the distance in accordance with a shift in position caused by the parallax of the object as projected on each light receiving sensor. The passive method utilizes ambient light. Thus, it is possible to perform accurate distance measurement if the object is bright enough for the light receiving sensor to detect the object. However, the accuracy decreases when the object does not provide sufficient contrast or is dark.

Another technique for the measurement of the distance to an object, the active method, uses light emitted from a light projecting element towards the object, which is then reflected by the object and detected by means of light receiving elements. The position of the spectral center of the light reflected from the object is used to determine the distance by the triangulation method. With the active method, while distance measurement is possible when the object is dark, has no contrast, or has repeated patterns which reflect light, it is difficult to provide highly accurate range finding for an object located at a relatively large distance away due to a decrease in the quantity of light reflected from the object.

As mentioned above, the passive and active methods have advantages and disadvantages. Therefore, a distance measuring apparatus having both the passive and active methods is desirable in order to obtain cameras having highly accurate distance measuring for various photo taking conditions.

With the active method, since reflected light, derived from a source of light, is detected for performing distance measurement, infrared light is used as the source of light. In this way, the light receiving elements can distinguish that light from ambient light. Thus, the active method allows for distinguishing the reflected light from ambient light or visible light. Consequently, the active method must necessarily use light receiving elements sensitive to infrared light. Thus, optical sensors formed in a line have normally been used as position sensing devices (PSDs).

With the passive method, since the contrast of an object is used for performing distance measurement, light receiving elements are used which are capable of outputting a light and dark contrast as a current value or voltage value, for example charge coupled devices (CCDs).

For this reason, it is necessary to have PSD and CCD light receiving elements, respectively, to facilitate the use of both active and passive methods. Moreover, it is also necessary to have additional optical systems associated with each method, which produces a more complex and larger constitution for the distance measuring apparatus. It is therefore difficult to provide a small and light-weight camera with such a distance measuring apparatus.

It is possible to envisage distance measuring based on both active and passive methods and which uses one of PSD or CCD sensors. However, the passive method will hardly function with PSDs since it is difficult to detect the contrast of the object while, due to the low sensitivity to infrared light of CCDs, it is difficult for CCDs to detect the reflected infrared light radiated from a source of light.

Thus, with the prior art, it has been found that in order to produce a distance measuring apparatus utilizing both methods and their consequent advantages, it has been necessary to constitute individual apparatus. For this reason, the constitution of the distance measuring apparatus has not been significantly simplified.

There is therefore a problem that the distance measuring apparatus can not be miniaturized, can not be reduced in weight, and can not provide any cost savings. Such apparatus can consequently not be applied to compact cameras. In this respect, since such cameras are typically equipped with automatic focusing (AF) devices, the mechanism of which occupies a large proportion of the volume and weight, incorporating a distance measuring apparatus with both methods into this type of camera is not beneficial in terms of improving miniaturization and weight reduction.

SUMMARY OF THE INVENTION

It is therefore an object of the present invention to provide a distance measuring apparatus using both the passive method and active method which is applicable to compact cameras.

According to the present invention there is provided a distance measuring apparatus for measuring the distance to an object, the apparatus comprising:

a plurality of charge coupled device (CCD) elements operated as at least two passive sensors for passive sensing;

a plurality of charge coupled device (CCD) elements operated as an active sensors for active sensing; and a light-emitting system having a light emission characteristic for irradiating an object with a required pattern of light intensity;

wherein the passive sensors and the active sensor are located to receive light emitted by the light emitting system and reflected by the object.

In this way, even when an object is so small or has a shape so irregular that the light reflected by an object is not totally received, a part of the pattern of light intensity still enables the detection of the position of the spectral center of an image. Thus, highly accurate distance measuring under any photo taking conditions can be provided.

In one embodiment, the light emitting system comprises a mask pattern with a predetermined light transmittance characteristic, and a single light emitting diode (LED) arranged to emit light through the mask pattern to provide the known light emission characteristic.

In another embodiment, the light emitting system comprises a plurality of light emitting diodes (LEDs) arranged with light emitting areas selected to emit light to provide the known light emission characteristic.

Conveniently, the pattern of required light intensity is an asymmetrical pattern in the longitudinal direction of the active sensor substantially perpendicular to an optical axis of emission of the light emitting system.

In a preferred embodiment, the light emitting system is actuable during active sensing and passive sensing. In this way, even when an object is a wall having even brightness, the required pattern of light intensity emitted by the light emitting system can be utilized as supplemental light during operation for the passive method, and thus the passive method can be more effective by utilizing the pattern.

DESCRIPTION OF THE ACCOMPANYING DRAWINGS

DESCRIPTION OF THE EMBODIMENTS

The present inventor has developed such a distance measuring apparatus with a passive sensor using charge coupled device (CCD) elements as the light receiving elements and an active sensor formed as one body. It has therefore been possible to take advantage of each method making it possible to provide highly accurate distance measuring.

As an example, the distance measuring apparatus can use one CCD line sensor and one light emitting diode (LED), with the line sensor being divided into three regions, with one region of the three and the LED providing active sensing while the other two regions provide passive sensing.

A distance measuring apparatus using both passive sensing and active sensing, which is formed as one body, allows highly accurate distance measuring by taking advantage of each method. Nevertheless, the aforementioned disadvantages in each method still remain as they are and thus it is difficult to completely eliminate adverse effects on distance measuring accuracy which result from these disadvantages.

As an example, when an object is a wall having even brightness or a repeated pattern with a bright ambient light, operations using the passive method may not be able to detect the aforementioned parallax. Moreover, it is difficult to perform effective operations using the active method as a result of too bright an ambient light. In addition, when the object is small with dark ambient light, operation of the passive method is difficult. Furthermore, even when the active method is used, light from the LED may not be effectively radiated onto the object and thus the position of the spectral center of the image may not be detected properly on the basis of the reflected light. Thus highly accurate distance measuring can not always be assured.

A distance measuring apparatus embodying the invention, however, uses both passive and active methods with a single body sensor and which mutually complement the disadvantages of each method.

Figure 1:
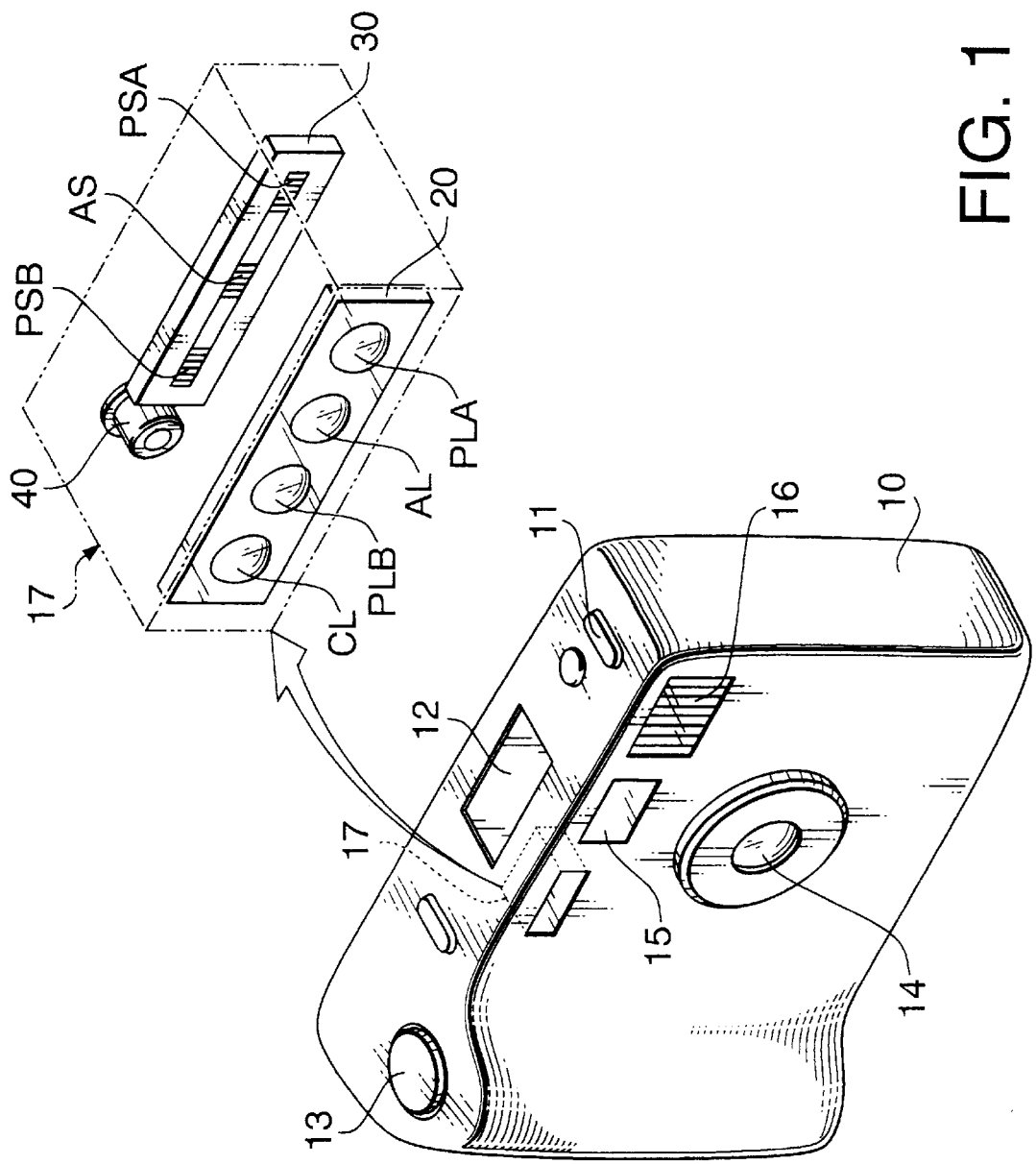
FIG. 1 illustrates a perspective view of a camera to which a distance measuring apparatus of an embodiment of the present invention is applied.

Referring to FIG. 1, a compact camera is provided with a camera body having a multi-function switch 11, an LCD display portion 12, and a release button 13 on the upper surface thereof.

The front of the camera has a photo-taking lens 14 therein. In addition, there is provided a viewfinder window 15, a strobe 16, and a distance measuring apparatus 17 embodying the present invention. The distance measuring apparatus is intended to measure the distance of an object to be photographed from the camera.

The distance measuring apparatus, which is provided at the side of the viewfinder window 15, has an optical system comprising a plurality of lenses formed as one compound lens 20, a line sensor 30 on which images of the object are formed, and a light emitting diode (LED) 40 which radiates the object with light.

Figure 2:
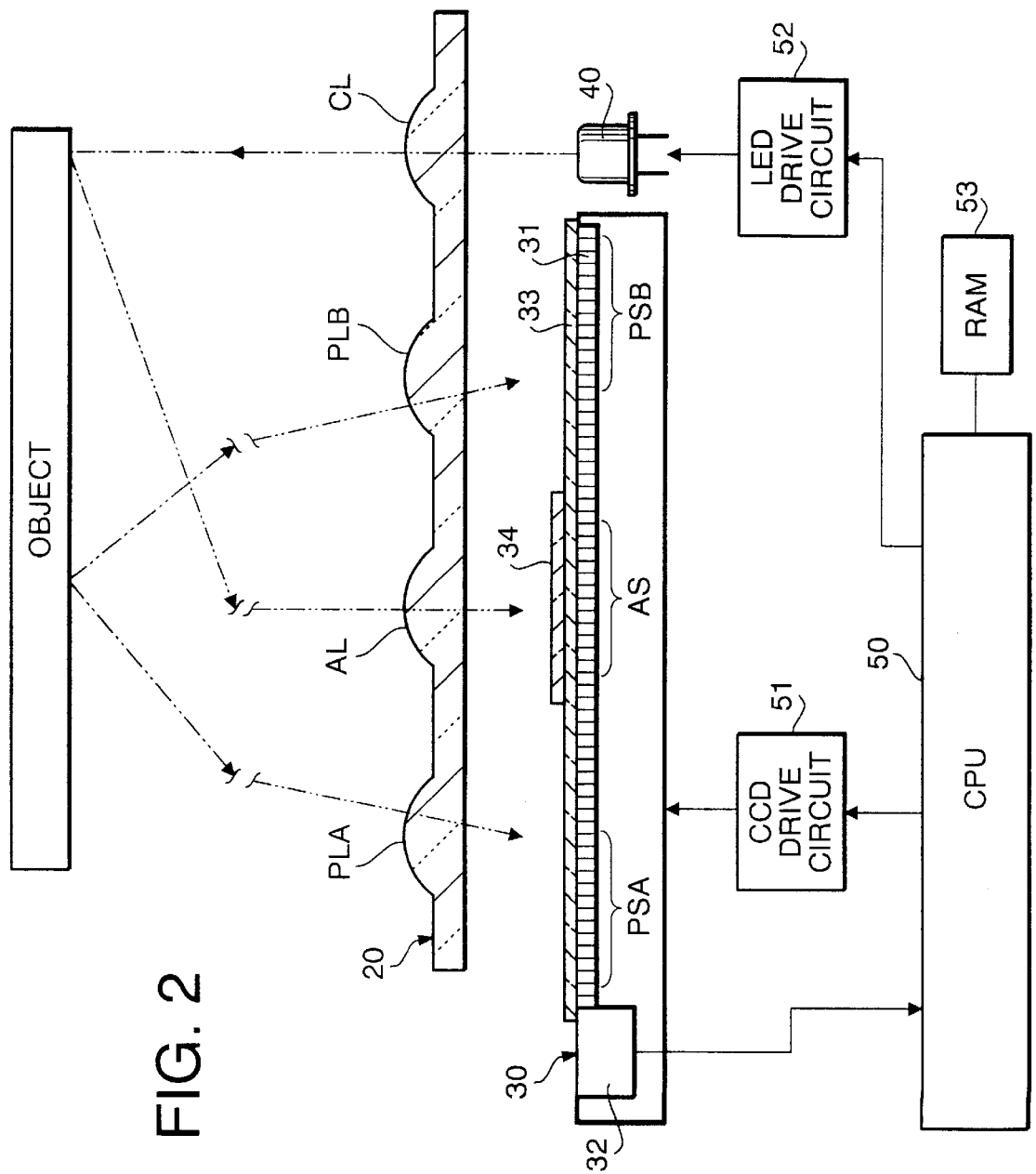
FIG. 2 illustrates a plan view showing the configuration of the distance measuring apparatus used in the camera of FIG. 1.

Referring to FIG. 2, the line sensor 30 has a light receiving portion 31 comprising a plurality of CCD elements arranged in a straight line. Light incident on the light receiving portion 31 is photo-electrically converted by the elements into an electric charge which is then accumulated therein. This accumulated electric charge is then transferred in a controlled manner along the line to be output as a voltage signal from an output portion 32 provided at one end of the line. Thus, the line sensor 30 can detect the intensity of the light received at the light receiving portion 31.

In the present embodiment, the light receiving portion 31 is divided into three regions which do not overlap one another. The regions at either end of the line are constructed as passive sensors PSA and PSB, and with the central region constructed as an active sensor AS. An infrared light cut-off filter 33 for cutting out infrared light is provided on the light receiving surface of the line sensor to span across the aforementioned three regions. In addition, a visible light cut-off filter 34 for cutting out visible light is overlaid on the light receiving surface at the region of the active sensor AS.

The LED 40 has a pattern mask 41 provided in front of the emission surface thereof, the pattern being irregularly shaped. The light emitted by the LED 40 irradiates an object with a brightness pattern corresponding to the pattern on the pattern mask 41. The LED 40 is selected to emit light of a wavelength within the region of spectral sensitivity of the CCD elements comprising the line sensor 30, and also close to the infrared light region rather than to the visible light.

Figure 3:
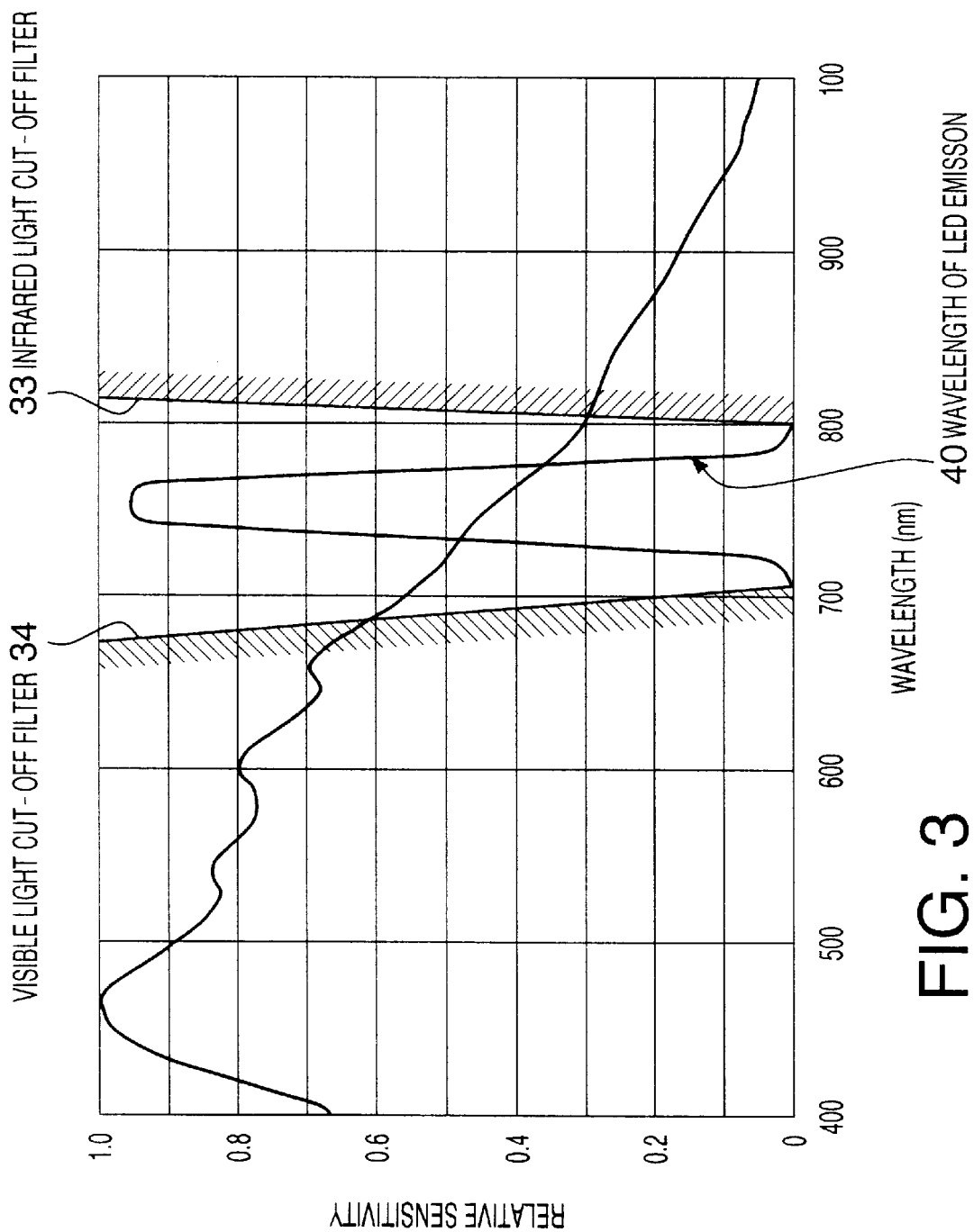
FIG. 3 shows a graph of the spectral sensitivity characteristics of parts of the distance measuring apparatus used in the camera of FIG. 1.

FIG. 3 shows an example of a plot of the spectral sensitivity characteristics of a CCD element together with the cut-off characteristics of the cut-off filters 33 and 34. The LED 40 is therefore selected to emit light of a wavelength longer than the cut-off wavelength of 700 nm of the filter 34 and shorter than the wavelength 800 nm of the filter 33. For example, the wavelength may be approximately 750 nm.

The compound lens 20 has two passive lenses PLA and PLB which are located to face the passive sensors PSA and PSB, one active lens AL which is located to face the active sensor AS, and a condenser lens CL which is located on the optical axis of the LED 40. Each of the passive and active lenses PLA, PLB, AL, and the condenser lens CL are arranged horizontally at predetermined intervals and formed as one body. The compound lens 20 may be formed as one body from, for example, transparent resin.

The line sensor 30 is connected to a CPU 50 and a CCD drive circuit 51. According to drive signals from the drive circuit, an output signal from the output portion 32 is inputted to the CPU 50. The LED 40 is also connected to the CPU 50 via an LED drive circuit 52. As described below, the CPU 50 selects either the passive or active method as the appropriate operation for distance measurement for the camera. Thus, the CPU 50 actuates the LED 40 to emit light at predetermined intervals in an active method operation while inhibiting the LED 40 to emit light in a passive method operation except in special cases.

In each operation, the output from the line sensor 30 is captured and a calculation of the distance to an object is performed. The CPU 50 is also connected with a RAM 53 for storing various kinds of data required for distance measurement calculation.

The distance measurement by the above described apparatus will now be explained below.

Figure 4:
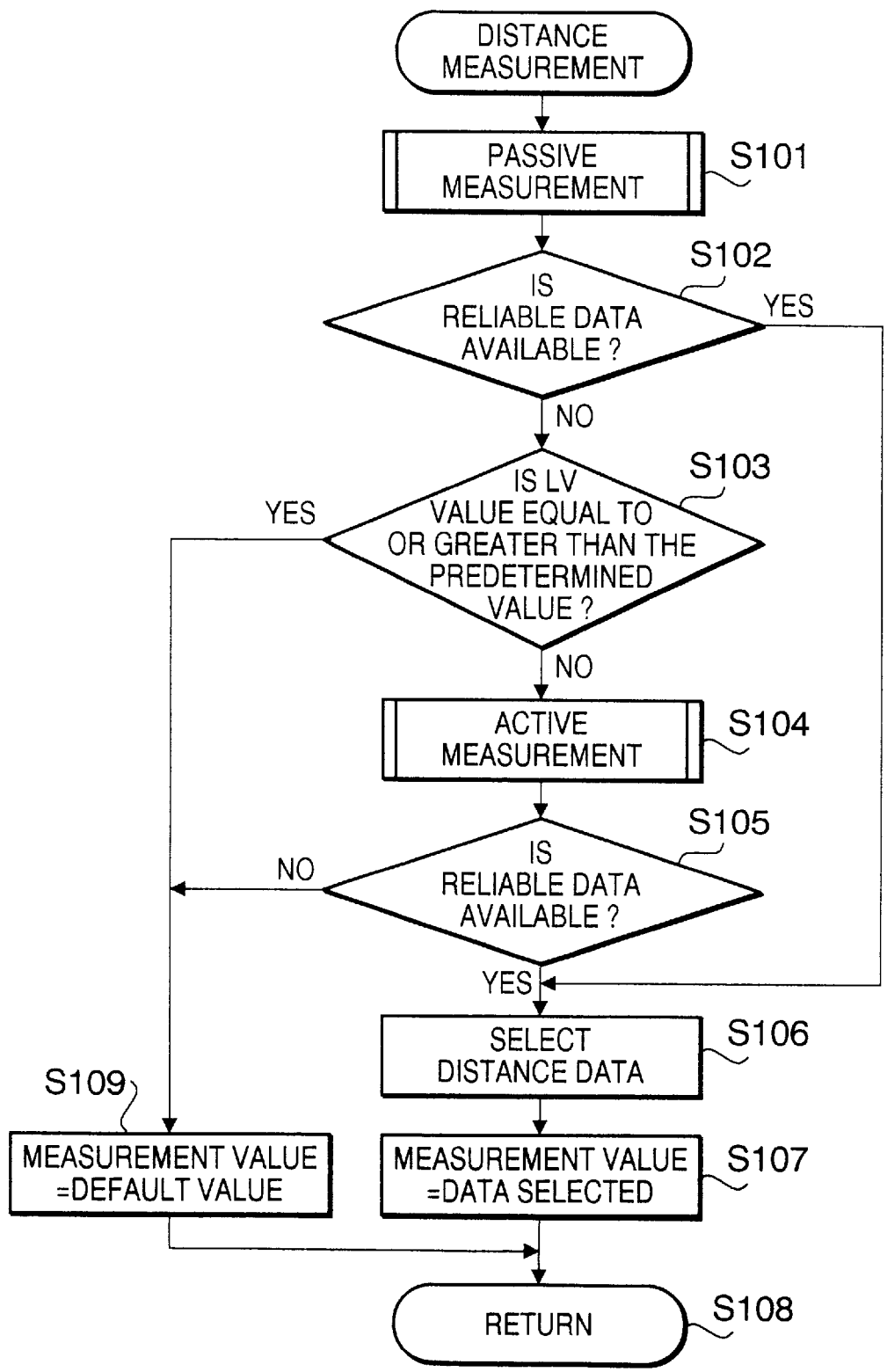
FIG. 4 is a flowchart showing the operation of the distance measuring apparatus used in the camera of FIG. 1.

FIG. 4 is a flowchart that shows a distance measurement operation. First, a distance measurement command is input to the CPU 50 from the camera side which causes the CPU 50 to execute the passive method operation (S101). In this passive method operation, the CPU 50 outputs an integration start command to the CCD drive circuit 51.

As a consequence, the line sensor 30 starts integration and then ends the integration on receipt of an accumulation end command from the drive circuit 51. Subsequently, the electric charge accumulated in the light-receiving portion 31 is transferred to the output portion 32 in synchronization with a clock signal and outputted therefrom as data in the form of A/D converted current or voltage. The data is stored in the RAM 53 and the CPU 50 subsequently calculates therefrom the distance to the object.

Figure 5:
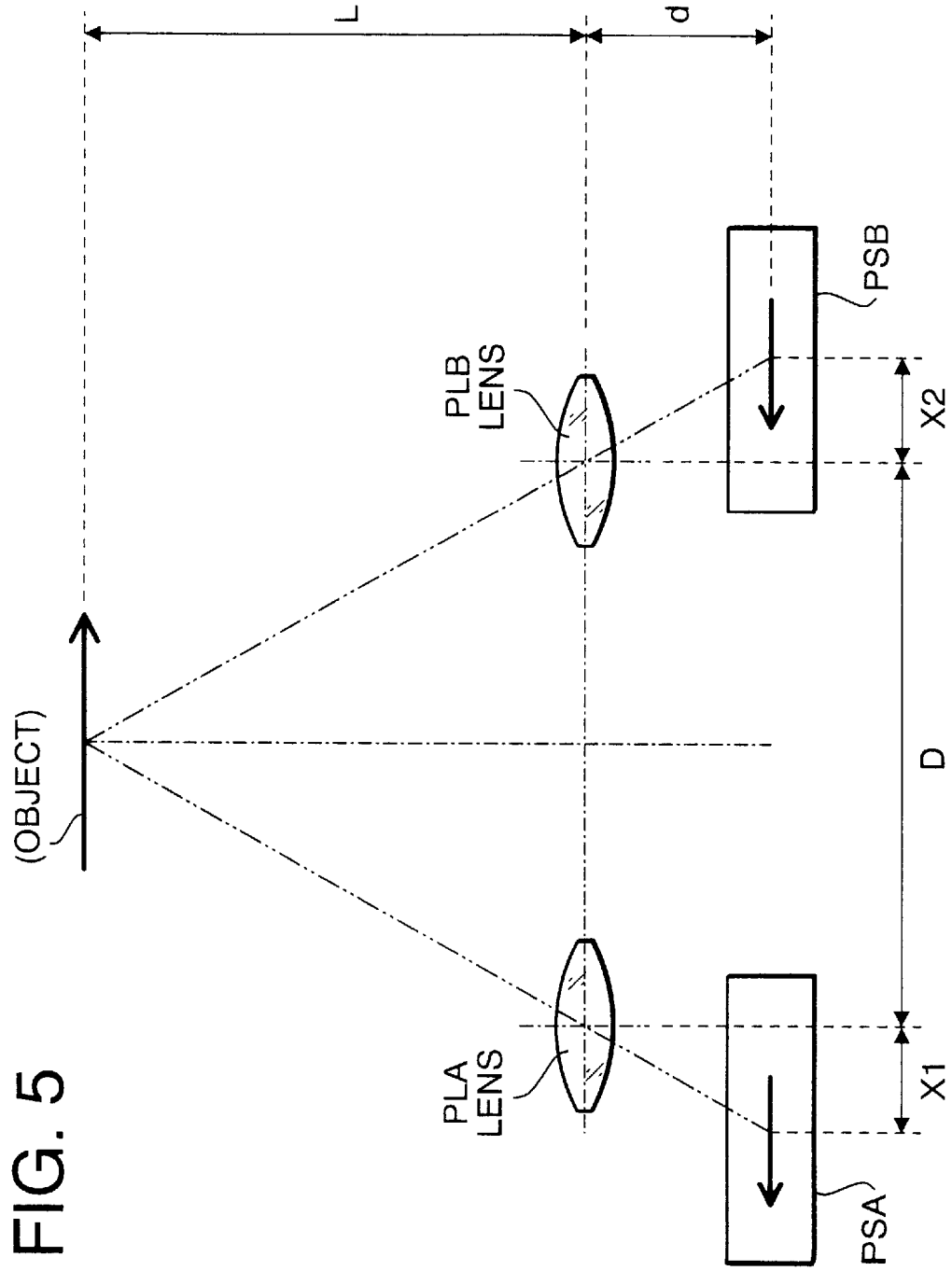
FIG. 5 is a schematic diagram explaining distance measurement for the camera of FIG. 1 operating using a passive method.

The operation of the distance measurement is the same as the conventional passive method, but will be briefly explained below. Referring to FIG. 5 a respective image of the object targeted for distance measurement is formed by the two passive lens PLA and PLB on the passive sensors PSA and PSB at both sides of the line sensor 30.

With the arrangement illustrated, the distance between the optical axes of the two passive lenses PLA and PLB is D, and the distance from both passive lenses PLA and PLB to each passive sensor PSA and PSB is d. The distances of the optical axis of each passive lens PLA and PLB from a particular point of each object image formed on each passive sensor PSA and PSB, for example, the horizontal center point, are x1 and x2 respectively while the distance from the object to the camera is L.

Then, according to trigonometry the following equation can be derived:

$$(L+d)/L=(D+x1+x2)/D \quad (1)$$

From this, the following equation can be derived,:

$$L=(D \cdot d)/(x1+x2) \quad (2)$$

Figure 6A:
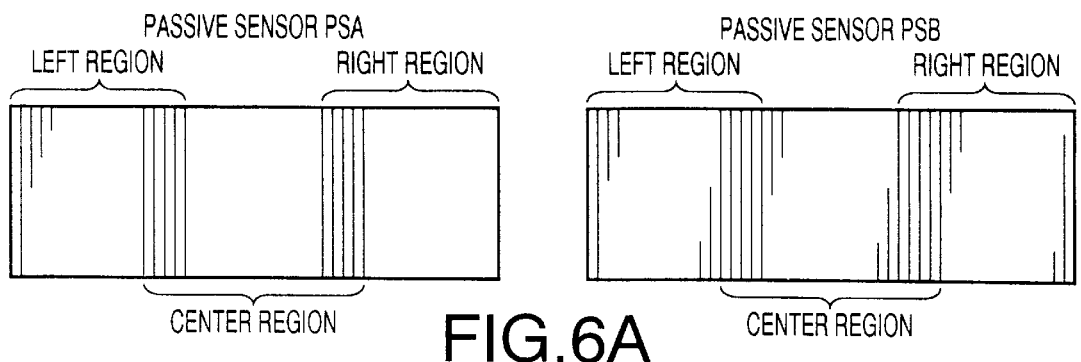
FIGS. 6A through 6C illustrate a method for detecting the image position of the spectral center in the passive method.

The passive method requires the detection of the parallax resulting from a difference in the position, on the passive sensors PSA and PSB, of the image from the same object. As shown in FIG. 6A, in this embodiment, each passive sensor PSA and PSB is divided, in the longitudinal direction of the line sensor 30, into three regions defined as the right region, center region, and left region, with their boundaries slightly overlapping.

Figure 6B:
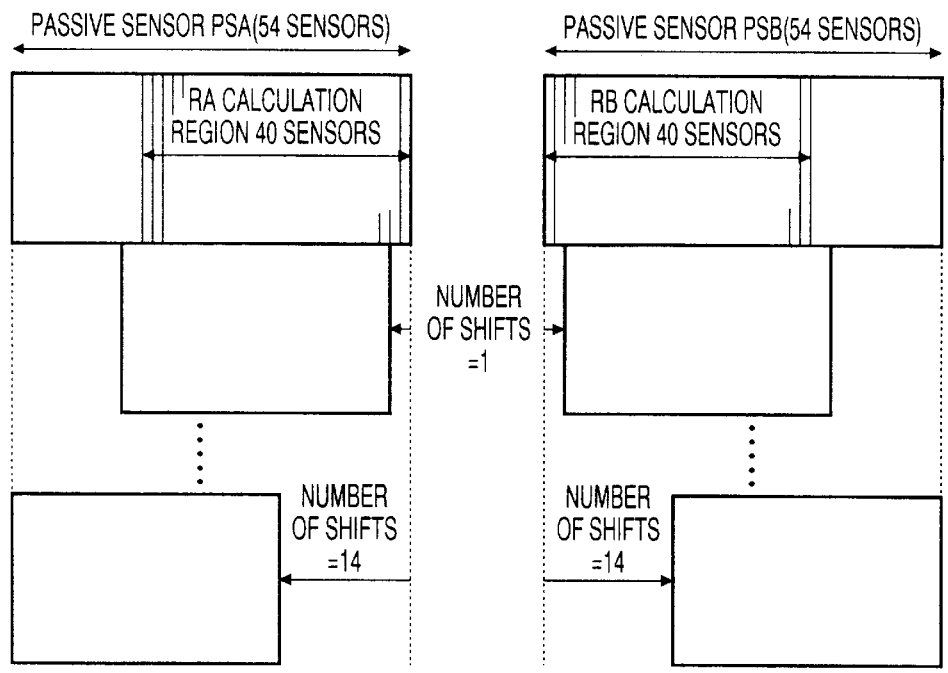

As shown in FIG. 6B, in the present embodiment, the right region, center region, and left region of each passive sensor PSA and PSB comprise fifty-four (54) elements respectively. For each region, a group of CCD elements in number equal to or greater than half the total number of elements in that region are selected as a calculation region RA and RB corresponding to sensors PSA and PSB respectively. In this embodiment, forty (40) elements are used for the calculation regions RA and RB. The calculation regions RA and RB are arranged at line symmetrical positions in the regions across both passive sensors PSA and PSB. Then, differences in the output for each element between both passive sensors are determined by shifting the elements of each calculation region one by one alternately between each passive sensor. The differences in output are also added over the calculation regions RA and RB. Consequently, in the present case, only fourteen (14) elements are shifted at each calculation region RA and RB thereby providing twenty-nine (29) pieces of data including differences in output with non-shifted states added.

It will be appreciated that the number of elements in each region and in each calculation region can be varied.

Figure 6C:
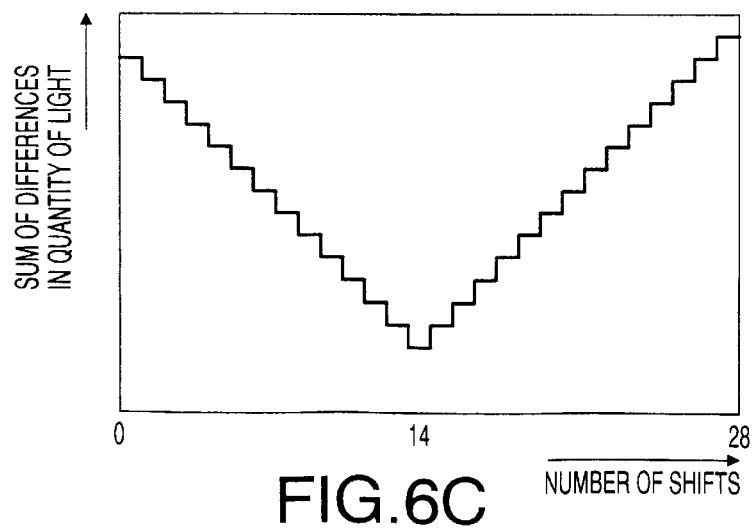

FIG. 6C show that the data results in a minimum value at a certain shift position, whereby the parallax (phase difference) can be determined. Therefore, the values of x1 and x2 in equations (1) and (2) can be obtained as a phase difference (x1+x2) so that the object distance L can be calculated.

The aforementioned calculation is performed for each of the three regions of each passive sensor.

Now, referring back to FIG. 4, the reliability of the data in the distance measuring calculation with the passive method, as described above, is judged in step S102. When it is determined that reliable data exists, the most reliable data is selected (S106) as distance measuring data to obtain a distance value (S107), and then the distance measurement is finished (S108). In the judgement of reliability, for example, the calculation can be performed for each of the divided three regions of each passive sensor PSA and PSB, respectively, with a plurality of calculations being performed for each region.

An average value and a variation for each distance measurement data are calculated from the plurality of distance measurement data thus obtained. Data which has an average value and variation value within a predetermined range of error is considered as reliable data. Then, one of the most reliable data is selected from the reliable data, and a distance measurement is calculated from that selected data.

If it is judged that no reliable data can be obtained in step S102, the CPU 50 executes the active method operation (S104).

Before performing the active method operation, it is determined whether the brightness of ambient light (Lv value) measured by a photometer (not shown) is equal to or greater than a certain level (S103).

With a value of Lv equal to or greater than a certain level, while the light emitted from the LED 40 will be reflected from an object with the active method, it will be difficult for the line sensor 30 receiving the reflected light to distinguish clearly the reflected light from the ambient light. This will cause the accuracy of the distance measurement to decrease so that reliable data can not be obtained. In this case, when the Lv value is equal to or greater than a certain level, the distance measurement value is set to a predetermined default value (S109). The default value is normally set to 2 to 3 m. This is based on the fact that pictures are often taken with an object being spaced 2 to 3 meters from a camera. Therefore, when the distance measuring data can not be considered as reliable, the default value is adopted which increases the probability of photo taking being in focus to a certain extent together with a suitable depth of field.

When the value Lv is below the certain level mentioned above, the active method mode is actuated (S104).

Figure 7:
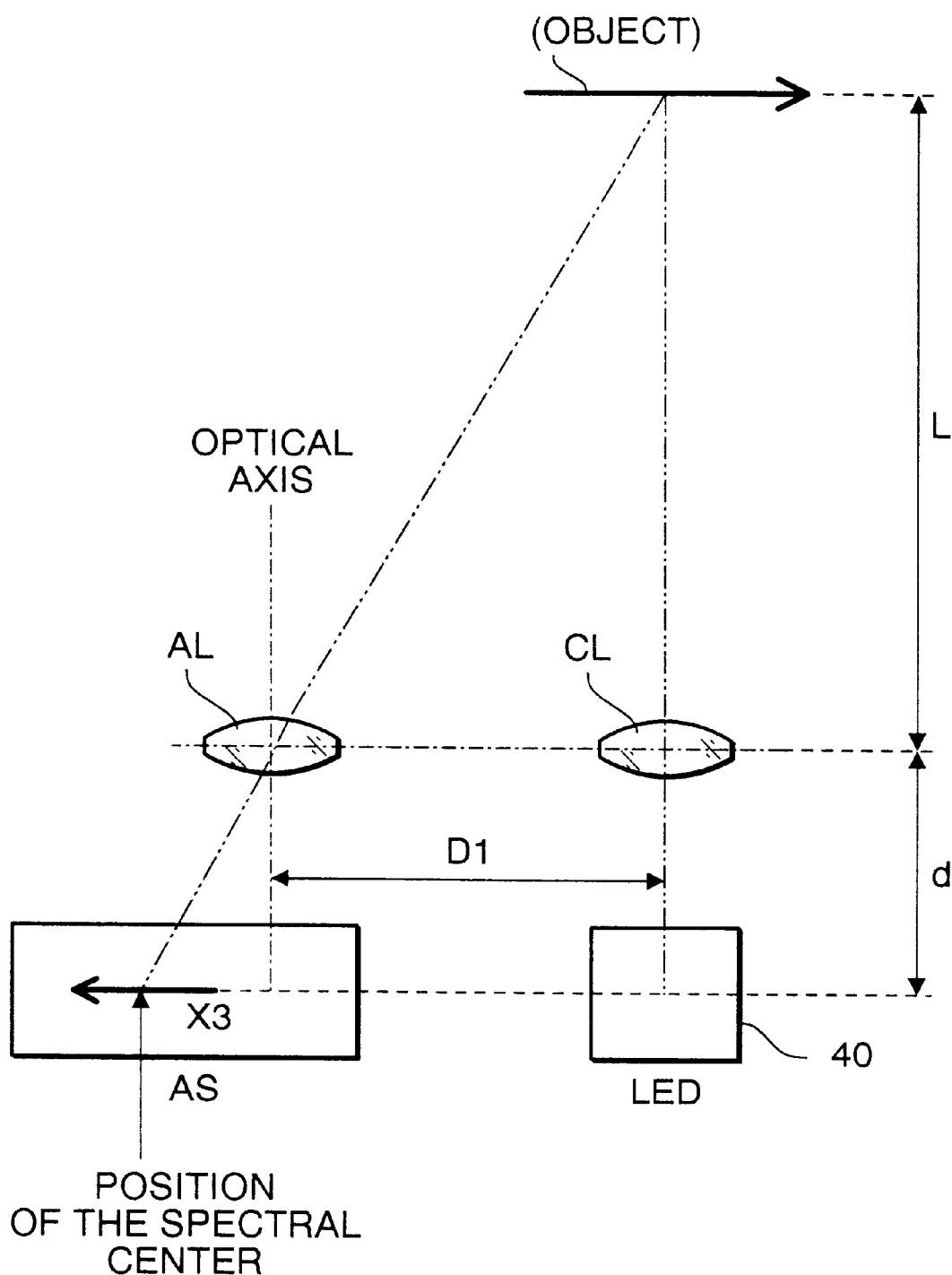
FIG. 7 is a schematic diagram explaining distance measurement for the camera of FIG. 1 operating using an active method.

The operation of the distance measurement for the active method will be explained below with reference to FIG. 7.

The LED 40 emits infrared light towards an object. This light is reflected from the object in a diffuse manner and an image is formed on the active sensor AS by means of the active lens AL. The optical axis of the diffusely reflected light from the object can be prior detected to establish a center for the optical axis, and then the active sensor AS can detect the spectral center of the image of the object. In the present case, the spectral center is detected as the position of the CCD element having the highest light intensity value among the plurality of CCD elements constituting the active sensor AS.

If the distance from the object to the camera is L, the distance from the LED 40 to the optical axis of the active lens AL is D1, the distance between the active lens AL and the active sensor AS is d, and the distance from the spectral center of the detected object image to the active lens optical axis is x3, then, the following equation is derived:

$$(L+d)/L=(D1+x3)/D1 \qquad (3)$$

From this, the following equation can be derived:

$$L=(D1 \cdot d)/x3 \qquad (4)$$

It will be appreciated that when the position of the spectral center of the image has been determined, the detection accuracy of that center can be improved by determining the difference between the output provided by the active sensor AS at the time of the previous passive method operation and the output resulting from the light emitted by the LED 40 and reflected by the object. If the wavelength characteristics of the visible light cut-off filter 34 arranged in front of the active sensor AS are in fact very sharp so that the active sensor AS does not receive visible light used in the passive method operation, there is no advantage to determining the difference between the outputs.

When the active method operation (S104) is performed, it is preferable for the LED to emit light repeatedly to produce distance measuring data at each emission of light so that a plurality of distance measuring data are provided.

As shown in FIG. 4, it is determined whether reliable distance measuring data has been obtained from the plurality of data, for example, in a similar manner to that for the passive method operation (S105). When it is determined that reliable data exists, distance measuring data is selected (S106) and the selected data is used as a distance value (S107).

If no reliable distance measuring data is obtained, for example, in the case where the output of the LED 40 is too small or the object is located too far away to identify accurately the position of the spectral center of the image, the aforementioned default value is used as a distance value (S109).

When the passive method operation is performed, detection is carried out using ambient light, that is, visible light at the passive sensors PSA and PSB. In the present embodiment, the line sensor 30 is provided on the front surface thereof with the infrared light cut-off filter 33 so that the line sensor 30 is barely able to detect the infrared light included in natural light thus enabling an increase in the accuracy of the distance measurement.

The operation of detecting the position of the spectral center of the image of the object in the active method will now be explained with reference to FIGS. 8 to 10.

Figure 8A:
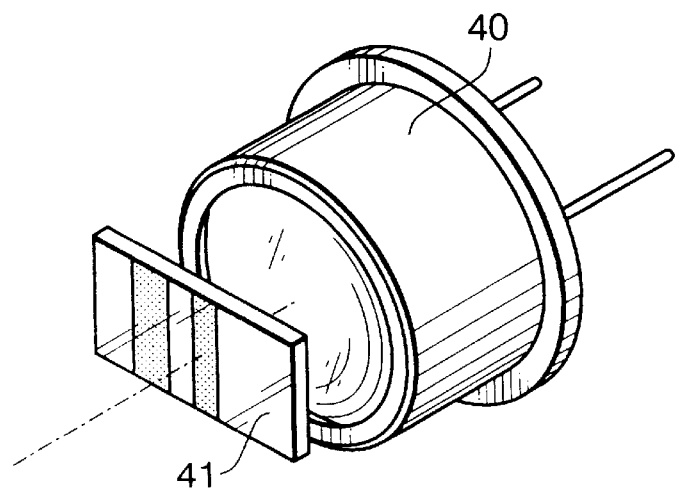
FIGS. 8A through 8C illustrate a perspective view of an LED and a pattern mask, illustrates the pattern of the pattern mask, and illustrates the light intensity transmission characteristic of light transmitted through the mask.
Figure 8B:
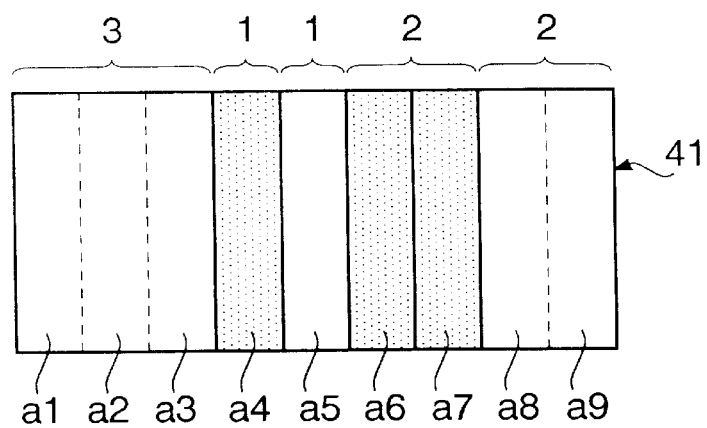
Figure 8C:
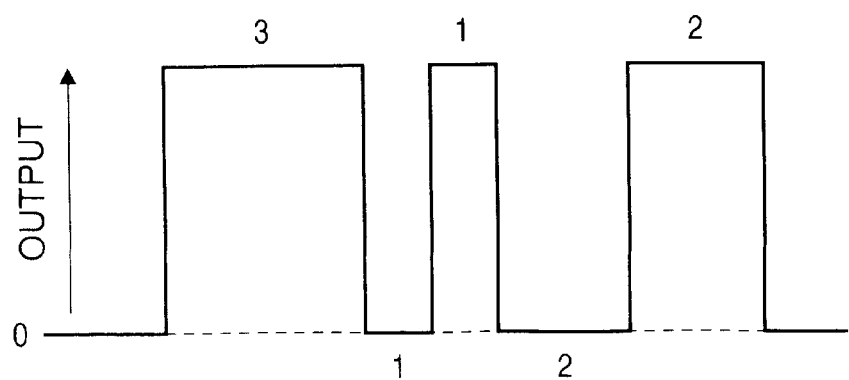

FIG. 8A shows a perspective view of the arrangement of the pattern mask 41 located in front of the LED 40, while FIG. 8B shows the shape of the pattern on the pattern mask 41. It can be seen that the pattern mask 41 is divided into nine regions a1 through a9 in the left to right direction of FIG. 2 (hereinafter referred to as "the horizontal direction"). Regions a4, a6, and a7 are made optically opaque while the other regions are made optically transparent. Thus, light emitted from the LED 40 and passing through the pattern mask 41 has a light intensity pattern as shown in FIG. 8B in the horizontal direction. This required pattern of light intensity is then radiated towards the object with the reflected light condensed by the condenser lens CL. Therefore, the light receiving characteristic of the active sensor AS is as shown in FIG. 8C when the reflected light from the object is totally received by the active sensor AS. Consequently, by detecting the intensity of light received in the horizontal direction it is possible to discern the aforementioned light intensity characteristic thereby enabling the detection of region a5, which has a high intensity of light and is located at the center in the horizontal direction, as the position of the spectral center for the active method.

On the other hand, when the light which passes through the pattern mask 41 is not totally radiated from an object because the object is small or is a recessed portion like a corner of a wall, the active sensor AS is no longer able to discern the light intensity characteristic shown in FIG. 8C and it is consequently difficult to detect the position of the spectral center by that method.

FIGS. 9A through 9H show eight forms of the objects in which this situation can arise. In each drawing, the diagonally shaded areas show regions at which the active sensor AS did not receive light so that this part of the light intensity characteristic was missing. In this circumstance, the position of the spectral center is detected according to the operation shown in the flowchart in FIG. 10.

Initially, the intensity characteristic of the light received by the active sensor AS is checked to determine if the leftmost output width has three regions of high light intensity present or not (S201).

Figure 9A:
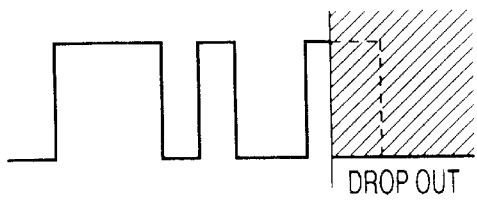
FIGS. 9A through 9H illustrate changes in the characteristic shown in FIG. 8 for reflection from different objects.
Figure 10:
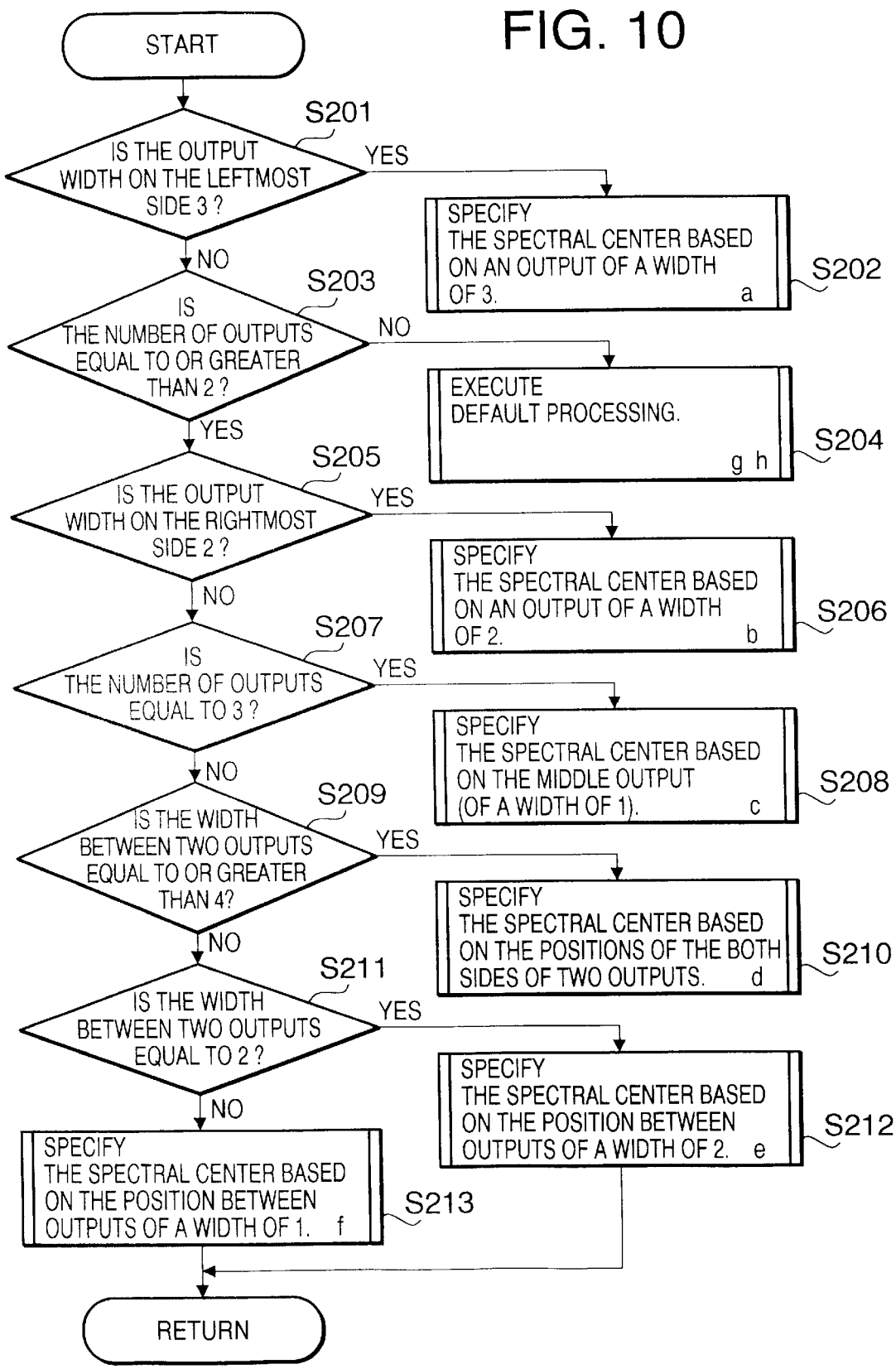
FIG. 10 is a flowchart explaining the detection of the spectral center of the characteristic of FIG. 8 during the operation of the active method.

Confirmation of the presence of three regions as shown in FIG. 9A indicates that these regions are a1 through a3, and since the second region from the rightmost end is region a5, the position of the spectral center can be detected immediately (S202).

Figure 9B:
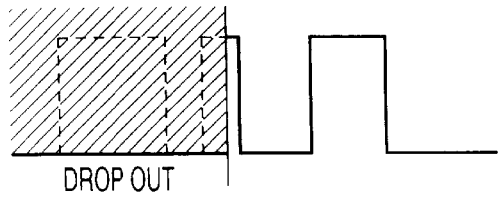
Figure 9C:
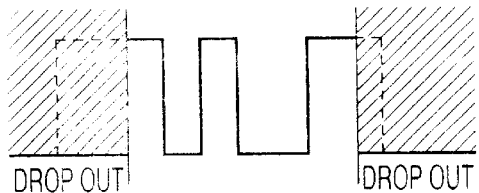
Figure 9D:
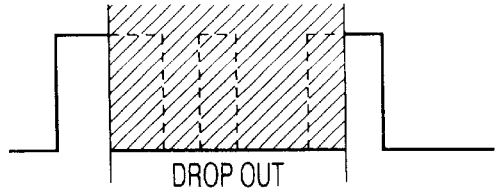
Figure 9E:
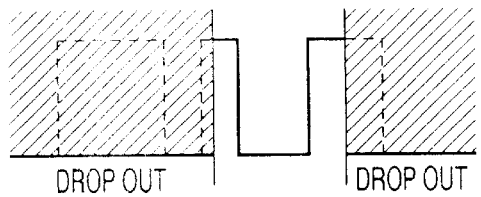

When it is found that the three regions are not present, a check is made to determine whether two or more regions of high light intensity are present at some point over the whole of the characteristic of the light received (S203). In the case that two or more regions are not present, a characteristic such as FIG. 9G or 9H is determined. Consequently, it is impossible to detect the position of the spectral center, and default processing is performed (S204). The default processing corresponds to that described above.

In the case that two or more regions are present, then a check is made to determine whether the rightmost output width has two regions present or not (S205). In the case that they are present, a characteristic such as FIG. 9B is determined so that the regions are a8 and a9,. Consequently, since the third region from the leftmost end is region a5, the position of the spectral center can be detected immediately (S206).

In the case that the rightmost output width does not have two regions at step S205, a check is made to determine whether three regions of high light intensity are present or not over the whole of the characteristic of the light received (S207). When three regions are present, a characteristic such as FIG. 9C is determined. In the case that three regions are detected, it is considered that the regions are regions a3 through a8 and thus the center region can be determined to be region a5, whereby the position of the spectral center can be detected (S208).

In the case that the number of regions is not three in step S207, a check is made to determine whether the width between two of the regions of high light intensity is four or more regions (S209). If the result is YES, a characteristic such as FIG. 9D is determined and thus the right side of the two regions can be considered to be region a9. Consequently, the fourth region to the left can be determined to be region a5 and thus the position of the spectral center can be detected (S210).

In the case that the result of step S209 is NO, then a check is made to determine whether the width between the two regions of high light intensity is two (S211). If the result is YES, a characteristic such as FIG. 9E is determined and thus the two regions can be considered to be region a5 and a8. Consequently, the left side region can be determined to be region a5 and thus the position of the spectral center can be detected (S212).

Figure 9F:
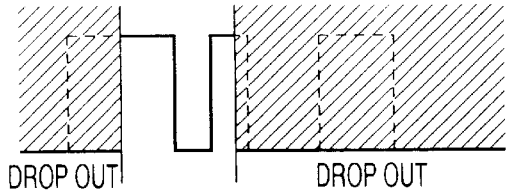
Figure 9G:
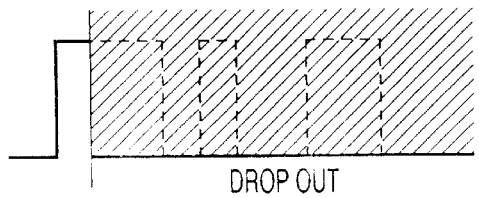
Figure 9H:
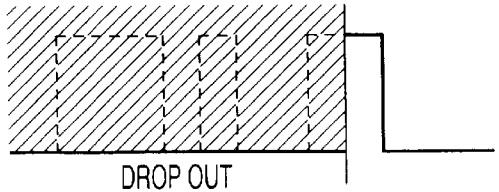

In the case that the result of step S211 is NO, it is considered that one region is present between the two regions of high light intensity, and a characteristic such as FIG. 9F is determined. In this case, the two regions are considered to be regions a3 and a5. Consequently, the right side region can be determined to be region a5 and thus the position of the spectral center can be detected (S213).

Therefore, as described above, even when light is emitted by the LED 40 through the pattern mask 41 towards an object without being totally reflected from the object such that the full light emission characteristic of the pattern mask 41 is not totally received by the active sensor AS, the position of the spectral center of the pattern of light intensity that is received can still be detected so that highly accurate distance measuring can be performed even with small sized objects or unusual photo taking conditions such as a corner of a wall.

It will be appreciated that the LED 40 used at the time of operation of the active method can also be used as supplemental light at the time of operation of the passive method.

In particular, when the object is a wall with an even brightness or a repeated pattern, the light intensity of an even or repeated pattern is produced on the passive sensors PSA and PSB. For this reason, even when the phase difference resulting from a shift of calculation region RA and RB is detected, the phase difference is hardly detected.

In this case, for such an object, light can emitted by the LED 40 to pass through the pattern mask 41 and be radiated towards the object so that the received reflected light is detected by means of the passive sensors PSA and PSB. The detection of the phase difference is then executed in accordance with the light receiving characteristics. Accordingly, the passive sensors PSA and PSB receive a pattern of light intensity corresponding to the pattern of the pattern mask 41. Consequently, highly accurate distance measuring becomes possible by performing the operation of the passive method with the light intensity pattern. In this case, even with bright ambient light, the light from the LED 40 overlaps the ambient light permitting effective use of the passive method.

In the distance measuring apparatus described above, LED 40 emits light through pattern mask 41 to radiate a pattern of light towards an object. The pattern mask 41 has an asymmetrical pattern in the horizontal direction. In an alternative arrangement shown in FIG. 11, three LEDs, 40A, 40B, and 40C, having different emission widths, are arranged in the horizontal direction in order to obtain a pattern of light corresponding with the light intensity characteristic shown in FIG. 8C.

The LEDs 40A through 40C form a high light intensity pattern which is equivalent to that in FIG. 8B. This configuration is more advantageous than the arrangement using a pattern mask since the pattern mask is not required. Although the number of LEDs used increases, the LEDs need not have a large emission surface.

Figure 11:
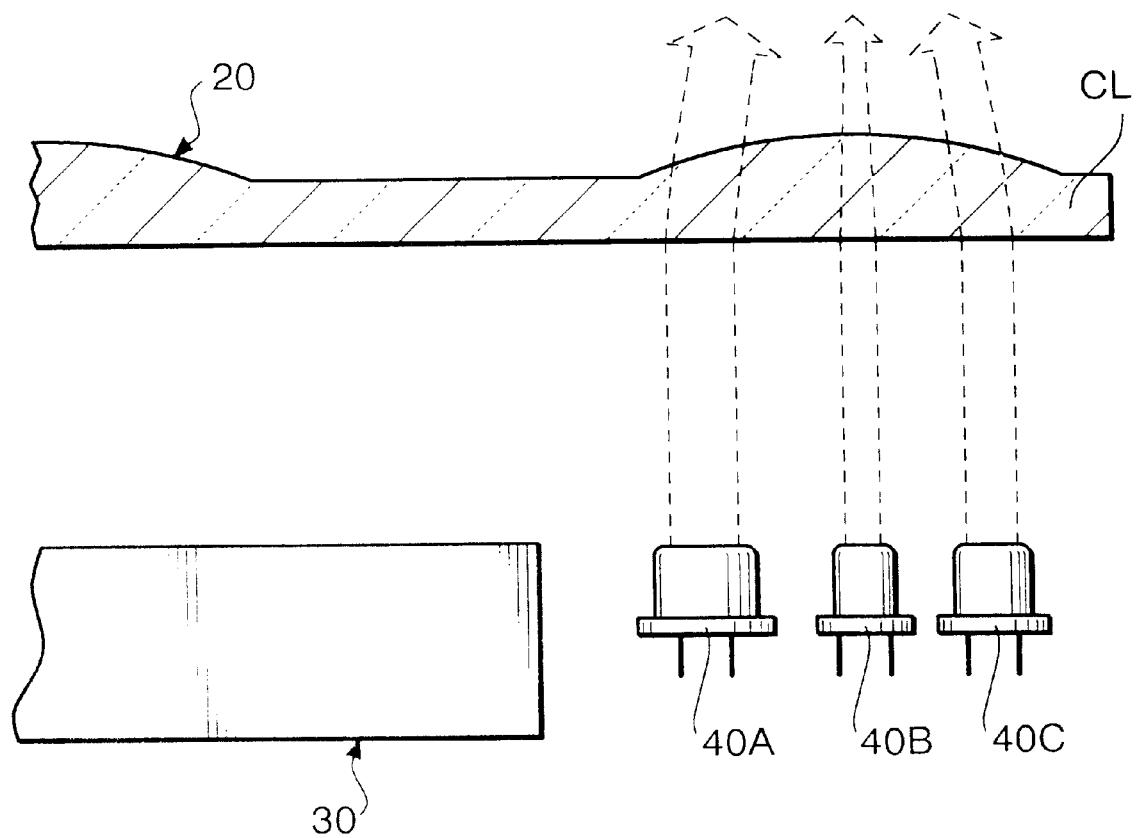
FIG. 11 illustrates a plan view showing an alternative arrangement of the LED for use in the distance measuring apparatus used in the camera of FIG. 1.

It will be appreciated that the present invention is not limited to the number of LEDs in FIG. 11 and the pattern of the mask shown in FIG. 8A.

As mentioned above, the distance measuring apparatus of the present invention enables distance measurement using the passive and active methods individually and has improved on the disadvantages of the passive and active methods respectively, enabling an increase in the probability of providing reliable distance measuring data under various photo taking conditions.

With the described embodiment, although the passive sensor and active sensor are constituted by a single line sensor comprising a plurality of CCD elements, they may be constituted by individual independent arrays of CCD elements or CCD line sensors. Especially when such independent sensors are used, each passive sensor and the active sensor do not need to be arranged in a row as in the present embodiment and can be arranged in two rows.

Furthermore, when each sensor is independently constructed as in the foregoing, each sensor can have an independent or synchronized drive control. In addition, the passive lens, the active lens, and the condenser lens may be constructed independently of one another, and their arrangement may be appropriately determined corresponding to the arrangement of each sensor.

It will be appreciated that the distance measuring apparatus of the present invention may be applied to cameras employing silver film, as well as to various kinds of cameras such as digital cameras and video cameras. The combination of the distance measuring apparatus of the present invention with AF devices enables highly accurate AF photo taking.

The distance measuring apparatus of the present invention is constructed in a manner such that a light emitting system used for the operation of the active method emits light having a particular or predetermined light intensity pattern towards an object, and the passive sensors and active sensor are arranged to receive the pattern of light intensity in the reflected light. This therefore provides distance measuring using both passive and active methods. Furthermore, the active method can still be applied even when the object has an irregular shape and the passive method can be applied when the object has an even brightness. Thus, disadvantages of the passive and active methods can be improved to obtain highly accurate distance measuring data under a wide variety of photo taking circumstances.

The present disclosure relates to subject matter contained in Japanese Patent Application No. HEI 10-273772 filed on Sep. 28, 1998 and Japanese Patent Application No. HEI 11-160846 filed on Jun. 8, 1999, which are expressly incorporated herein by reference in their entirety.

What is claimed is:

1. A distance measuring apparatus for measuring the distance to an object, the apparatus comprising:

a plurality of charge coupled device (CCD) elements comprising at least two passive sensors for passive sensing;

a plurality of charge coupled device (CCD) elements comprising an active sensor for active sensing; and a light emitting system having a light emission characteristic for irradiating an object with a pattern of light intensity that is asymmetrical in a longitudinal direction of the active sensor and substantially perpendicular to an optical axis of light emitted by said light emission system;

wherein said passive sensors and said active sensor are located to receive light emitted by said light emitting system and reflected by the object.

2. Apparatus according to claim 1, wherein said light emitting system comprises a mask pattern with a predetermined light transmittance characteristic, and a single light emitting diode (LED) arranged to emit light through the mask pattern to provide said light emission characteristic.

3. Apparatus according to claim 1, wherein said light emitting system comprises a plurality of light emitting diodes (LEDs) arranged with light emitting areas selected to emit light to provide said light emission characteristic.

4. Apparatus according to claim 1, wherein said sensors have a light receiving surface thereof provided with an infrared light filter, and a light receiving surface of said sensor operated as an active sensor is provided with a visible light filter; and wherein said light emitting element emits light in a region of wavelengths between a visible light region and an infrared light region.

5. Apparatus according to claim 1, wherein each of said CCD elements in the sensors are arranged parallel to an elongate axis.

6. Apparatus according to claim 5, wherein each of said CCD elements are arranged on said axis.

7. Apparatus according to claim 5, wherein said active sensor is located at a central portion of said axis with said passive sensors located at both ends of said axis.

8. Apparatus according to claim 1, wherein each of said passive and active sensors is controllable to be driven independently of or in synchronization with one another.

9. Apparatus according to claim 1, further comprising an optical system for forming an image of said object on said sensors;

wherein the optical system comprises passive lenses for forming an image of said object onto said passive sensors, an active lens for forming an image of an object corresponding to said active sensor, and a condenser lens for condensing light which said light emitting element emits and is directed to the object, said lenses being formed as a single body.

10. Apparatus according to claim 1, wherein corresponding CCD elements of said two passive sensors are mutually compared when light from the object is incident thereon;

wherein a particular point of an image of the object is detected at said at least two passive sensors in accordance with a difference which results from said comparison; and wherein the distance to the object is calculated in accordance with the difference in said particular points at said passive sensors.

11. Apparatus according to claim 1, wherein CCD elements of the active sensor are compared to detect a CCD element corresponding to the spectral center of a received image of the object;

wherein the spectral center of the received image at said active sensor is determined in accordance with the CCD element detected; and wherein the distance to the object is calculated in accordance with the determined position of the spectral center.

12. Apparatus according to claim 11, wherein said active sensor is provided to enable a difference to be determined between a light receiving output therefrom during passive sensing and a light receiving output therefrom during active sensing; and wherein the spectral center of the received image at said active sensor is determined assuming that said difference is caused by light which is emitted by said light emitting element and then reflected by the object.

13. Apparatus according to claim 1, wherein said light emission characteristic is split into a plurality of regions of contrasting light intensity; and wherein the spectral center of the received image is evaluated according to the regions of contrasting light intensity that are detected by the active sensor.

14. Apparatus according to claim 1, comprising a control circuit for operating said passive sensors during passive sensing and said active sensor during active sensing, and wherein said passive sensing is performed initially.

15. Apparatus according to claim 14, wherein said active sensing is conducted when reliable distance measuring data is not obtained when said passive sensing is performed.

16. Apparatus according to claim 15, wherein said control circuit detects the ambient brightness level and said active sensing is performed when said detected level is equal to or less than a predetermined level.

17. Apparatus according to claim 1, wherein said light emitting system is actuable during active sensing and passive sensing.

* * * * *